May 26, 1936.    C. F. TREMOUROUX ET AL    2,041,981
REAPER-BINDER
Filed Aug. 7, 1935
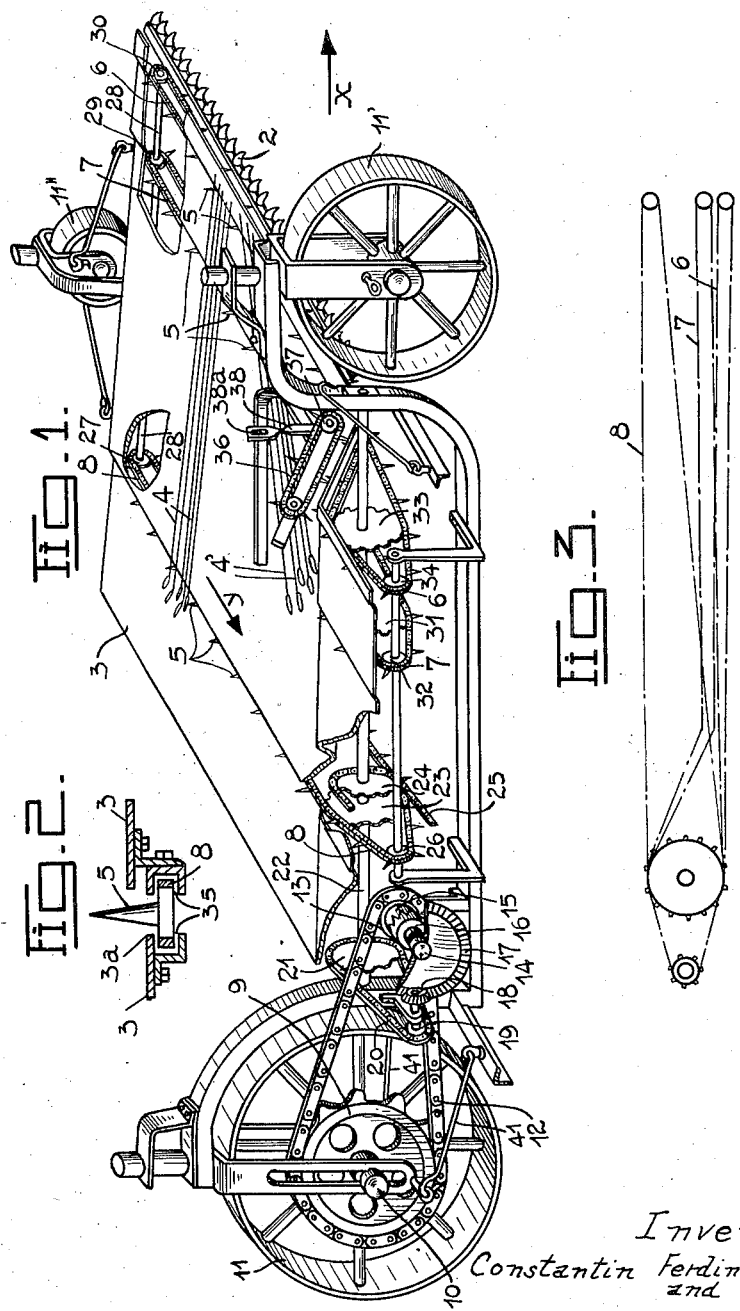
Inventors:
Constantin Ferdinand Tremouroux
and
Constantin Emile Tremouroux
By Emil Bönnelycke
Attorney Patented May 26, 1936

2,041,981

UNITED STATES PATENT OFFICE 2,041,981

REAPER-BINDER

Constantin Ferdinand Tremouroux and Constantin Emile Tremouroux, Ernage, Belgium Application August 7, 1935, Serial No. 35,184
In Germany August 14, 1934

5 Claims. (Cl. 56—131)

The present invention relates to a reaper-binder comprising a horizontal conveyor and a lifting device each constituted by a fixed apron on which the corn cut by the machine slides towards a knot tying mechanism parallel to a reaping mechanism and under the action of driving members actuated by chains, the said fixed apron and the said chains being common to the horizontal conveyor and to the lifting device.

Reaper-binders of this type are known in which the above-mentioned chains actuate driving laths disposed above the apron which is common to the horizontal conveyor and the lifting device. These chains are maintained by rollers at the bottom of the elbow formed at the base of the lifting device. When, in practice, large bundles of corn fall on the chains and, in particular, on to the chain which moves along near the cutting mechanism, these bundles have to pass between the chains and the above mentioned rollers and produce considerable overtensioning of the chains. The result of this is that there is a danger of the latter breaking.

The object of the present invention is to eliminate this disadvantage.

To this effect, in the machine in accordance with the invention, the said common chains are disposed in a manner known in itself, for the horizontal conveyor or for the lifting device, beneath the common apron on which the corn slides and they are guided by this common apron into the elbow that the latter forms at the base of the lifting device.

By this arrangement, when large bundles of corn fall on to the horizontal conveyor, they do not rest on the chains and, therefore, do not overtension them when the latter pass from the horizontal conveyor to the lifting device.

The invention also has as its object an advantageous feature of the fixed apron. This apron is, generally speaking, made up of several sheets disposed on either side of the driving members carried by the chains.

With an apron of this type, it can happen that the ears of corn pass through the opening between two neighbouring sheets beneath the sheet which is the further from the reaping mechanism, thus causing accumulations of corn which can bring the machine to a standstill.

For overcoming this disadvantage, in accordance with the present invention, the opposite edges of two neighbouring sheets are arranged at different levels such that the edge of the sheet which is the further from the reaping mechanism is a little lower than that of the sheet which is nearer this mechanism.

Other features and details of the invention will appear in the course of the description of the drawing attached to the present specification and which illustrates diagrammatically and merely by way of example one embodiment of the invention.

Figure 1 is a perspective view, certain parts being shown broken away, of a reaper-binder in accordance with the invention. The parts which have nothing to do with the invention proper have not been shown in order not to complicate the drawing needlessly.

Figure 2 is a section through one of the hook chains and its guide.

Figure 3 shows diagrammatically and in front elevation the paths followed by the hook chains.

The reaper-binder in accordance with the invention comprises a reaping mechanism and a knotting mechanism. These two mechanisms do not form part of the invention. The reaping mechanism proper is shown at 2 while the knotting mechanism is not shown at all but would be mounted to the front of Figure 1. In operation, the machine moves in the direction of the arrow X. The corn stalks cut by the reaping mechanism 2, under the action of the vanes usually provided for this purpose but not shown because they have nothing to do with the invention, fall on to an apron 3. The latter is fixed and is made up of several metal sheets. The stalks which have fallen as shown at 4 on to the apron 3 are displaced over the latter transversely to the direction X in which the machine moves, that is to say, in the direction of the arrow Y, this displacement being effected by means of hooks 5 carried by endless chains 6, 7 and 8.

The chain 7 is arranged relatively near the chain 6 which is adjacent to the reaping mechanism 2. In this way, stalks such as those shown at 4' which fall obliquely relatively to the direction of the arrow Y and cannot be reached by the chain 8 are, nevertheless, carried towards the knotter by at least two chains.

To enable the chains 6, 7 and 8 to be driven as a consequence of the movement of the machine, a sprocket 9 is keyed on the axle 10 of a carrying wheel 11, the other carrying wheels being designated 11' and 11". On the sprocket 9 is mounted a chain 12 which also passes over another sprocket 13 freely mounted on a shaft 14 but rigidly connected to a sleeve 15 provided with dogs. The latter is in engagement with another similar sleeve 16 which is maintained out of contact with it when the machine is inoperative. The sleeve 16 is keyed on the shaft 14 which carries a bevel wheel 17 engaging with a bevel pinion 18 fixed to a small sprocket 19 over which passes a chain 20. The latter also passes over a sprocket 21 keyed on the shaft 22. Two other sprockets 23 and 24 are keyed on the latter. The sprocket 24 serves for driving the knotting mechanism as well as the packing members (not shown) through a chain 25.

The chain 8 passes over the sprocket 23 and over small sprockets 26 and 27. The latter sprocket is keyed on a shaft 28 as are the sprockets 29 and 30 over which pass respectively the chain 7 and the chain 6. The chain 7 passes over sprockets 31 and 32, analogous to the sprockets 23 and 26, and the chain 6 over sprockets 33 and 34, also analogous to the sprockets 23 and 26. The sprockets 31 and 34 may be freely mounted on their shaft.

The chains 6, 7 and 8 are thus driven by pulling on the lower stretch which is not in contact with the elbow formed by the apron between the horizontal conveyor and the lifting device.

During their displacement, the chains are guided on the tension side by a slideway 35 (Figure 2) formed by the edge 3a of one of the sheets forming the apron 3 and by parts fixed to the two sheets adjacent to the chain under consideration. Figure 2 also show that the edge 3a of one of the sheets is at a lower level (for example one centimetre) than the level of the edge of the other sheet. It is the edge of the sheet which is the further from the reaping mechanism which is at the lower level as can be seen by examination of Figure 1.

Extra hook chains can be provided above the inclined part of the chains 6, 7 and 8. One of these extra chains is shown at 36. The chain 36 can be mounted so that it can move away from the inclined part of the chain 6 when the heap of stalks that is being conveyed is too thick. To this effect, the pivot of the sprocket 37 over which it passes is supported by a stirrup 38 having a groove 38a into which passes a pin or bar belonging to the frame. The chain 36 may be driven by the shaft 22 through a mechanical connection which has not been illustrated.

When the hooks 5 arrive near the end of their operative stroke, they fall progressively beneath the apron 3 while still remaining approximately parallel to themselves owing to the fact that the sprockets 26, 32 and 34 are situated at a lower level than that of the sprockets 23, 31 and 33.

It is clear that the invention is not limited to the embodiment illustrated and that many modifications can be made to the shape, the arrangement and the constitution of the elements of which it is made up without exceeding the scope of the present invention.

We claim:

1. A reaper-binder comprising a horizontal conveyor and a lifting device constituted each by a fixed apron on which the corn slides towards a knotting mechanism parallel to a reaping mechanism under the action of driving members driven by chains and passing into slits between the sheets constituting the apron, characterized in that the facing edges of two neighbouring sheets are at different levels such that the edge of the sheet which is the further from the reaping mechanism is a little lower than that of the sheet nearer to this mechanism.

2. A reaper-binder comprising a reaper mechanism arranged transversely to the direction of travel of the machine, a fixed apron on which the reaped corn falls presenting a substantially horizontal part and a relatively inclined part, slits formed in this fixed apron parallel to the reaper mechanism, movable chains guided under the fixed apron, and hooks carried by these chains and passing through the said openings.

3. A reaper-binder comprising a reaper mechanism arranged transversely to the direction of travel of the machine, a fixed apron on which the reaped corn falls presenting a substantially horizontal part and a relatively inclined part, slits formed in this fixed apron parallel to the reaper mechanism, movable chains guided under the fixed apron, and hooks fixed to the links of said chains and passing through the said openings.

4. A reaper-binder comprising a reaper mechanism arranged transversely to the direction of travel of the machine, a fixed apron on which the reaped corn falls presenting a substantially horizontal part and a relatively inclined part, slits formed in this fixed apron parallel to the reaper mechanism, chains under said fixed apron, hooks carried by these chains and passing through the said openings, and means for moving said chains, said means being situated at the end of the machine opposite to that at which the said inclined part is situated and acting on the stretch of the chains which is not guided by the fixed apron.

5. A reaper-binder comprising a reaper mechanism arranged transversely to the direction of travel of the machine, a fixed apron on which the reaped corn falls constituted of several sheets, slits between these sheets, parallel to the reaper mechanism, movable chains under said slits, hooks carried by said chains and passing through said slits, the facing edges of two neighbouring sheets being at different levels such that the edge of the sheet which is the further from the reaper mechanism is a little lower than that of the sheet nearer to this mechanism.

CONSTANTIN FERDINAND TREMOUROUX.
CONSTANTIN EMILE TREMOUROUX.